R. A. PALMER.
GEAR CASING.
APPLICATION FILED NOV. 14, 1908.

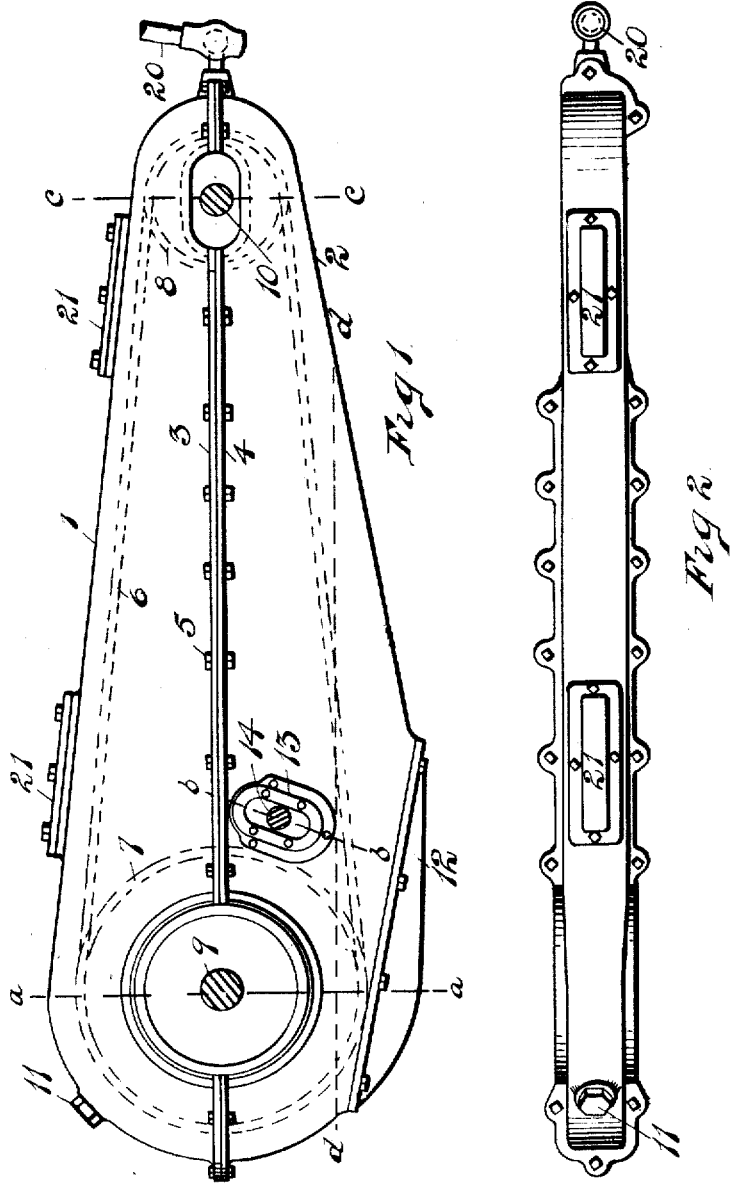

954,400.

Patented Apr. 5, 1910.
3 SHEETS—SHEET 2.

R. A. PALMER.
GEAR CASING.
APPLICATION FILED NOV. 14, 1908.

954,400.

Patented Apr. 5, 1910.

3 SHEETS—SHEET 3.

UNITED STATES PATENT OFFICE.

RANDALL A. PALMER, OF DETROIT, MICHIGAN, ASSIGNOR TO CARTERCAR COMPANY, OF PONTIAC, MICHIGAN, A CORPORATION OF MICHIGAN.

GEAR-CASING.

954,400.  Specification of Letters Patent.  Patented Apr. 5, 1910.

Application filed November 14, 1908. Serial No. 462,610.

*To all whom it may concern:*

Be it known that I, RANDALL A. PALMER, a citizen of the United States, residing at Detroit, county of Wayne, State of Michigan, have invented a certain new and useful Improvement in Gear-Casings, and declare the following to be a full, clear, and exact description of the same, such as will enable others skilled in the art to which it pertains to make and use the same, reference being had to the accompanying drawings, which form a part of this specification.

This invention relates to gear casing for motor vehicles, and has for its object an improved device of this type, that will efficiently exclude mud and dust from the working parts of the chain, and its sprocket wheels, which will aid in the application of a lubricant thereto, and which is easily accessible and adjustable for purposes of repair or occasional cleansing.

Figure 3:
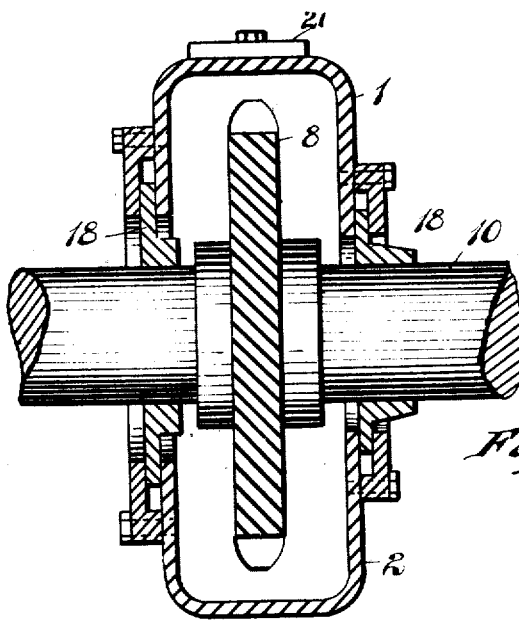
Figure 4:
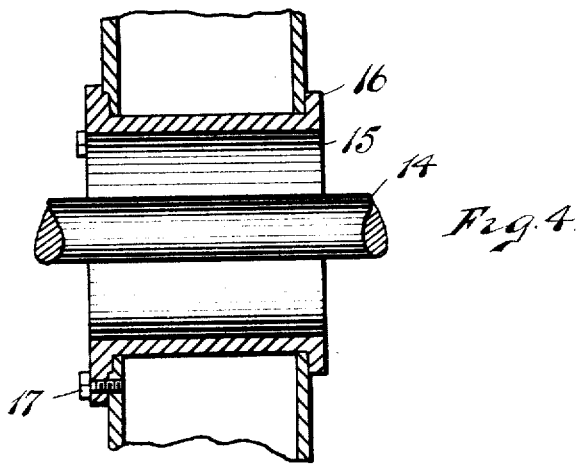
Figure 5:
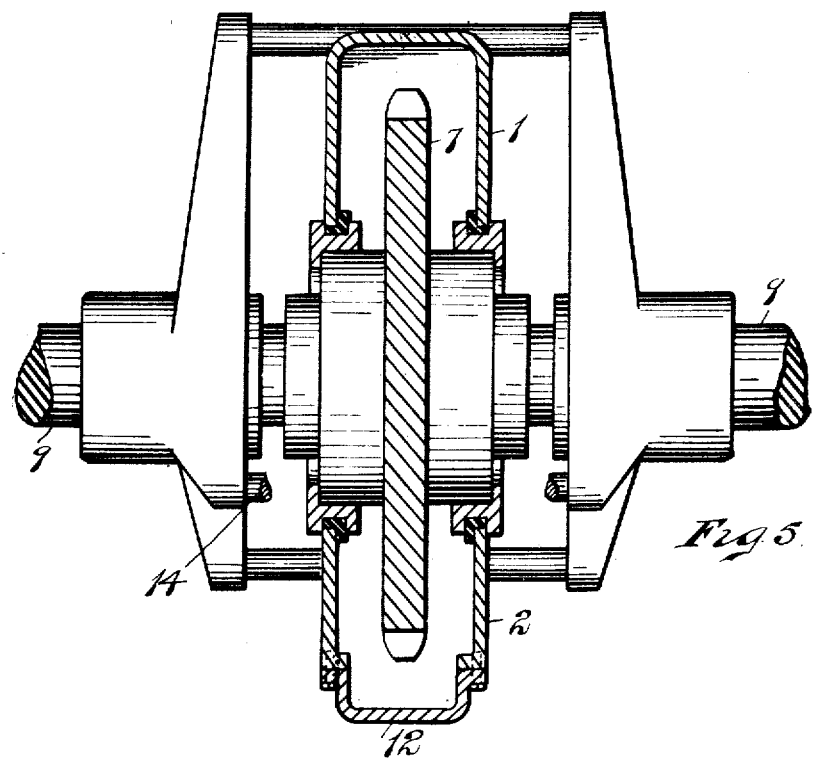
Figure 6:
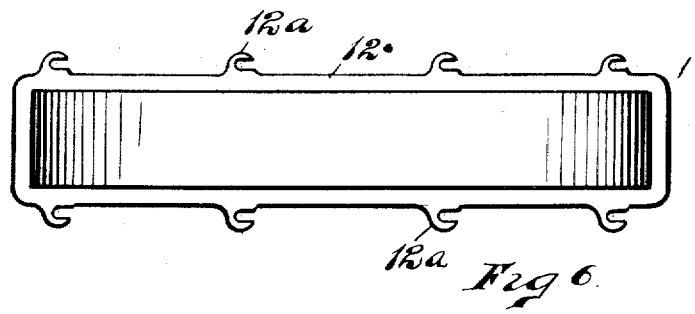

In the drawings:—Figure 1, is a side elevation of the casing, with the shafts which pass therethrough shown in section, and with the relative position of the chain and sprocket wheels indicated in dotted lines. Fig. 2, is a plan view of the same from above. Fig. 3, is an enlarged cross sectional elevation of the smaller of the two sprocket wheels, and the adjacent portion of the casing along the line $c$—$c$ Fig. 1, the shaft whereon the sprocket wheel is mounted being shown in elevation. Fig. 4, is the same view along the line $b$—$b$ Fig. 1. Fig. 5, is a sectional view through the portion of the casing inclosing the differential gearing, along the line $a$—$a$ Fig. 1. Fig. 6, is a plan view of the cap piece 12, showing the attaching clips along its lateral edges.

1 and 2 represent the upper and lower sections of the casing piece, each being made in a single piece; these are complementary one to the other, and are united along their flanged edges 3 and 4 by means of bolts 5, passing therethrough. The large sprocket wheel 7 and the small wheel 8 are mounted on shafts 9 and 10, which pass transversely through the casing near the opposite ends thereof. The web and flange portions of the casing are cut away to a considerable extent about the shaft 9, so that whatever the relative movement of the various parts of the machinery to one another, due to the roughness of the road, etc., either vertically or horizontally, it will not have the effect of causing the shaft to strike and injure either the surrounding casing or itself. The portion that is cut away about the shaft 10 is preferably made in the form of an ellipse, so as to allow for greater horizontal than vertical movement. The chain 6 passes over the sprocket wheels at a convenient and safe distance from the adjacent inner faces of the casing.

Oil may be introduced, as desired, through the aperture 11, and it is designed that a sufficient quantity should be introduced so that it will accumulate in the bottom portion of the casing to a point perhaps the height indicated by the line $d$—$d$, so that, at each revolution of the chain it will, for a time, pass through this accumulated body of oil and be lubricated accordingly. Access to the interior of the case may also be had through the removable cover pieces 21, or by removal of the under cap piece 12, though, of course, this would necessitate the release of the oil confined in the bottom of the casing. This piece is preferably, though not necessarily, secured to the complementary part of the casing piece 2 by the engagement of the integral clip pieces 12$^a$ about and under the heads of bolts extending from the edge of the casing. These need only to be tightened slightly after the cap piece has been slipped into place to hold the same firmly; and similarly when it is desired to detach the cap piece, it is not necessary to unscrew the bolts to the point of removal to effect the release of the clip portions of the cap piece.

13 is an aperture through the casing whose edges thereabout are strengthened by turned over flanges of the material, and, through which a shaft 14, not connected with the sprocket wheels, may pass without conflict with the chain or casing, provision being made for its possible lateral or vertical movement, due to the jolting of the machine. The entry of dust or mud through this aperture is prevented by the presence of the sleeve 15 through which the shaft 14 passes, and which is held in place with respect to the casing, not only by its flanged edges 16, but by the set screw 17.

In Fig. 3 is shown the means used to exclude dust and dirt from the casing, and sprocket wheels at the point where the shaft 10 passes through; it comprises a chambered addition to the casing at each side at this point, consisting essentially of another wall piece secured outside of the main casing body and spaced therefrom by an intervening air space, which is designed to be filled in part by the engagement therein of a washer member 18, which is slidable with respect thereto, though fitting closely about the shaft; whereas, both the extra wall piece and the main casing is fixed in position, but appreciably spaced from the shaft.

The entire guard casing is suitably suspended from the frame of the machine by a knuckle-joint bar 20.

What I claim is:—

In a gear casing, the combination of an upper concaved member provided with a flanged edge and having inspection and lubricating apertures through its top portion, a complementary casing member similarly flanged for registry with said upper member, whereby holding bolts may be passed through them, and there being transverse apertures in the walls of the shell thus constituted for the passage of rotatable shafts therethrough and for permitting their rotation and possible wavering from their initial axial positions without engaging against the adjacent edges of the shell members, a supplemental casing section lying parallel with and spaced from the portions of the shells immediately surrounding one of said apertured portions, dust excluding washers adapted to engage closely about and to be supported by such shafts and to extend between the main casing walls and the adjacent supplemental casing to prevent the undesired entry of foreign matter, and a bottom closure member for said last mentioned casing, adapted to be removably secured thereto, whereby its concaved portion and the adjacent portions of its supporting casing are formed as a liquid containing basin at the bottom of the entire casing, substantially as described.

In testimony whereof, I sign this specification in the presence of two witnesses.

RANDALL A. PALMER.

Witnesses:
WILLIAM M. SWAN,
CLARENCE E. DAY.